United States Patent

Tam

[15] 3,661,426
[45] May 9, 1972

[54] COMBINATION WARNING SWITCH AND PROPORTIONING VALVE

[72] Inventor: George M. Tam, South Bend, Ind.
[73] Assignee: The Bendix Corporation
[22] Filed: June 1, 1970
[21] Appl. No.: 42,110

[52] U.S. Cl...........................303/6 C, 188/151 A, 188/349, 200/82 D, 303/84 A, 340/52 C
[51] Int. Cl......................B60t 8/26, B60t 11/34, B60t 17/22
[58] Field of Search............303/6 C, 22 A, 84 A; 188/349, 188/345, 151 A; 60/54.5; 200/82 D; 340/52 C

[56] References Cited

UNITED STATES PATENTS

| 3,464,741 | 9/1969 | Falk | 303/6 C |
| 3,448,230 | 6/1969 | Bueler | 303/6 C X |
| 3,480,333 | 11/1969 | Stelzer | 303/6 C |
| 3,542,438 | 11/1970 | Falk | 303/84 A |

Primary Examiner—Milton Buchler
Assistant Examiner—John J. McLaughlin
Attorney—Ken C. Decker and Plante, Hartz, Smith & Thompson

[57] ABSTRACT

A valve for use in an automotive vehicle having two separate braking systems is disclosed which includes a piston slidable in a bore of a housing, dividing the latter into first and second compartments which are in fluid communication with a corresponding one of the vehicle's braking systems. A proportioning seal is provided in one of the chambers, and the piston cooperates with the seal to meter flow of fluid through the chamber, thereby establishing a lower level of fluid pressure on one side of the seal than that existing on the other side of the seal. When a malfunction causes a pressure loss in the other chamber, the piston is urged away from the seal to permit unrestricted flow of fluid through the latter.

11 Claims, 1 Drawing Figure

PATENTED MAY 9 1972
3,661,426
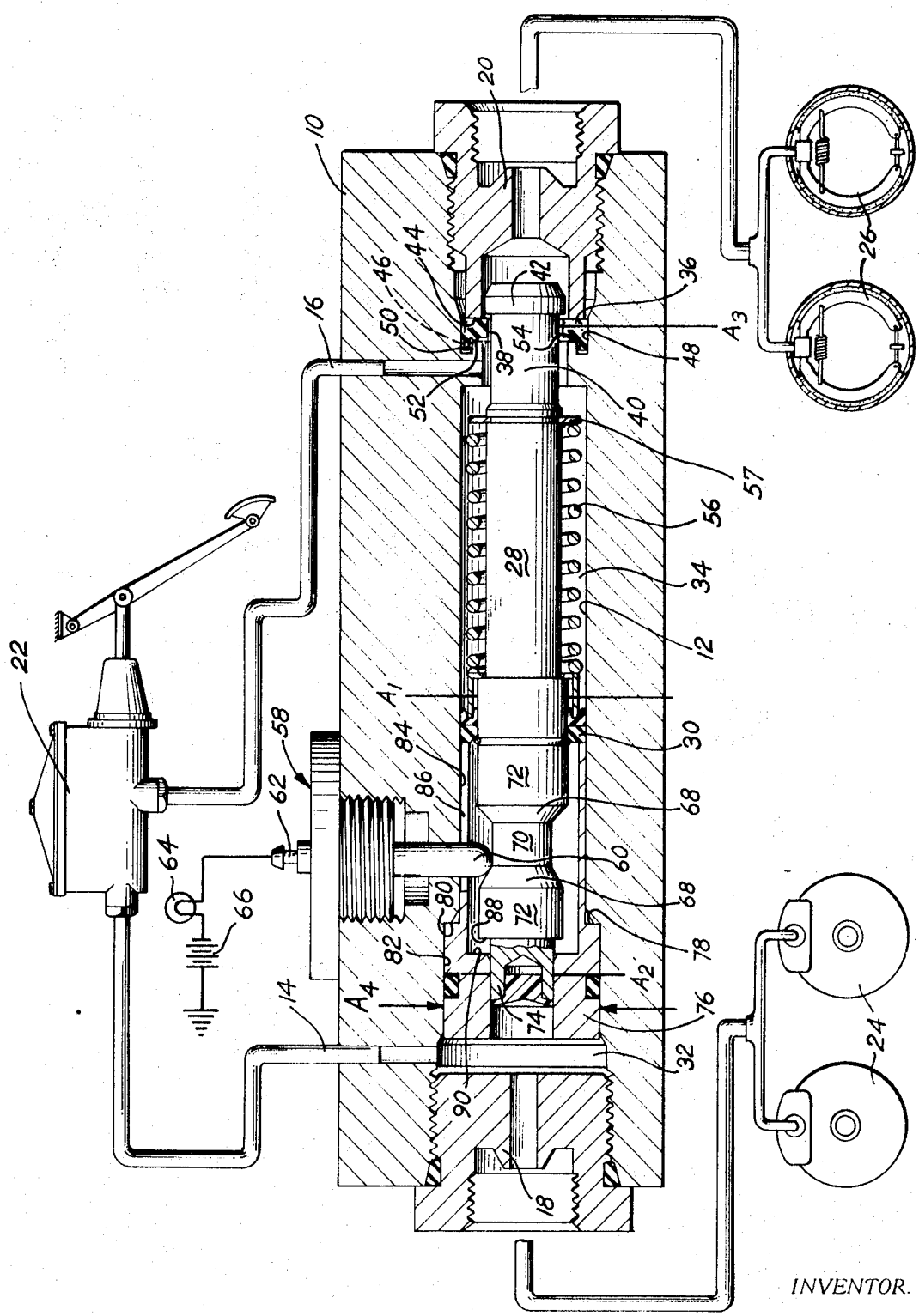
INVENTOR.
GEORGE M. TAM
BY Ken C. Decker
ATTORNEY

COMBINATION WARNING SWITCH AND PROPORTIONING VALVE

BACKGROUND OF THE INVENTION

This invention relates to a combination warning switch and proportioning valve for use in the braking system of a vehicle.

As is well known to those skilled in the braking art, dynamic weight transfer from the rear wheels to the front wheels of a vehicle causes the front wheel brakes to exert most of the braking effort when the vehicle is decelerated. Therefore, to prevent premature rear wheel lockup, it has become customary to include a proportioning valve in the rear brake lines to reduce the pressure applied to the rear wheels, especially in vehicles having disc brakes on the front wheels and conventional drum brakes on the rear wheels. However, should a malfunction in the hydraulic system that operates the front wheel brakes require that the rear wheel brakes alone stop the vehicle, it is desirable to obviate the effect of the proportioning valve so that the rear wheels may deliver their maximum braking effort. It is also desirable that a warning device be provided to signal the vehicle operator when such a malfunction occurs.

SUMMARY OF THE INVENTION

Therefore, an important object of my invention is to provide a warning switch and proportioning valve that are contained in a single housing.

Another important object of my invention is to enable unrestricted flow of fluid from the master cylinder to the rear wheel brakes when a malfunction prevents normal operation of the front wheel brakes.

A further object of my invention is to provide a valve using fewer parts than are used in many existing designs, thereby reducing the cost of the assembly.

DESCRIPTION OF THE DRAWINGS

The sole FIGURE of the drawings is a schematic view of a vehicle braking system with a combination warning switch and proportioning valve made pursuant to the teachings of my present invention illustrated in cross section.

DETAILED DESCRIPTION

Referring now to the drawings, a housing 10 defines a bore 12 therewithin and is provided with a pair of inlet ports 14, 16 and a pair of outlet ports 18, 20. The inlet ports 14 and 16 are each connected to one side of a split system master cylinder 22. Pressure is developed in the master cylinder 22 in the normal manner by operating a pedal in the vehicle operator's compartment. The outlet port 18 is communicated to disc brakes 24 on the front wheels of the vehicle, and the outlet port 20 is communicated to the drum brakes 26 on the rear wheels of the vehicle.

A piston 28 is slidably mounted in the bore 12 and cooperates with a seal 30 to divide the bore 12 into first and second chambers 32 and 34, respectively. An annular proportioning seal 36 is mounted in the chamber 34 and defines an annular opening 38 extending therethrough. The piston 28 extends through the opening 38 and presents a smaller diameter portion 40 that cooperates with the opening 38 in the seal 36 to define a fluid flow path therebetween through the seal and a larger diameter portion 42 that cooperates with a transversely extending face 44 on the seal 36 to alternately open and close fluid communication between the inlet 16 and outlet 20. Grooves 46 are provided in the face 44 and along the outer circumferential surface 48 of the seal 36 to permit flow of fluid around the seal when the fluid pressure at the outlet 20 exceeds that at the inlet 18 and the piston 28 prevents flow of fluid through the opening 38. When the pressure level at the inlet 16 is greater than the pressure level at the outlet 20, pressure acting against the lip 50 maintains the latter sealed against the wall of the bore 12, preventing flow of fluid through the grooves 46. Nodules 52 prevent the seal 36 from sealingly engaging the shoulder 54 in the bore 12. A spring 56 engages a snap ring 57 on the piston 28 to yieldably urge the larger diameter portion 42 of the latter away from the transverse face 44 of the seal 36.

A warning switch 58, of a type well known to those skilled in the brake art is carried by the housing 10 and includes a plunger 60 that projects into the bore 12 and an external terminal 62 that is connected in series to a warning device 64 in the vehicle operator's compartment and to a storage battery 66. Upward movement of the plunger 60 (viewing the Figure) closes a pair of contacts inside the switch 58 to complete an electrical circuit actuating the warning device 64. The plunger 60 is shifted by engagement with one of the conical camming surfaces 68 between diameter portions 72 on the piston 28. Therefore, as long as the plunger 60 remains engaged with the smaller portion 70 of the piston 28, the warning device 64 will not be actuated. However, if the piston 28 is shifted due to a pressure differential between the chambers 34 and 32, the plunger will be urged upwardly by the camming surfaces 68 and will maintain the contacts closed since after the piston is shifted the plunger 60 engages the larger diameter portion 72 of the piston 28. The axial length of the smaller portion 70 of the piston 28 is sufficiently great to permit normal movement of the portion 42 of the piston 28 into and out of engagement with the transverse face 44 of the seal 36 without actuating the warning device.

The leftwardmost end of the piston 28 (viewing the Figure) includes a section 74 having a diameter smaller than that of the portion 42. The section 74 is slidably received within a sleeve 76. The outer surface of the sleeve 76 is stepped to present a shoulder 78 that normally engages a shoulder 80 between larger diameter portion 82 and smaller diameter portion 84 of the bore 12. An axially extending slit 86 is provided in the sleeve 76 to permit the plunger 64 to project into the bore 12.

MODE OF OPERATION

When the vehicle operator applies the brakes, substantially equal fluid pressures are communicated to the chambers 32 and 34. However, since the fluid in chamber 34 acts across area $A_1$, which is larger than area $A_2$ against which the fluid in chamber 32 acts, a net force acts on the piston 28 urging the latter to the left viewing the Figure. When this force is sufficient to overcome the force of spring 56, piston 28 moves to the left to sealingly engage the portion 42 with the transverse face 44 on the seal 36. Further fluid communication between inlet 16 and outlet 20 is prevented until the pressure level in chambers 32 and 34 is increased by the vehicle operator. When this occurs, the piston 28 moves to the right to permit flow of fluid through chamber 34 since the increase in pressure acts across area $A_2$, which is larger than area $(A_1-A_3)$ against which the increased pressure in chamber 34 acts. However, the portion 42 of the piston closes against the face 44 before the pressure at the outlet 20 equals the pressure at the inlet 16, since after the piston is urged away from the seal 36, pressure buildup to the right of the seal acts across the entire area $A_3$. A lower pressure level is therefore established at the outlet 20 than that existing at the inlet 16. The piston 28 continues its proportioning action with the seal 36 as long as the vehicle operator increases the master cylinder pressure.

When the vehicle operator decreases the braking pressure, pressure at the outlet 20 urges the piston 28 to the left, deforming the seal 36 to expand the volume of the outlet fluid compartment, thereby decreasing the pressure of the fluid contained therein. When the inlet pressure is reduced still further to a value below the pressure level at the outlet 20, fluid flows from the outlet to the inlet around the seal 36 through the grooves 46. When the pressure at the outlet 20 is reduced a sufficient amount, the spring 56 forces the piston 28 away from the seal 36 to permit fluid to flow freely from the outlet to the inlet.

If a malfunction causes loss of pressure in the chamber 32, the higher pressure in the chamber 34 urges the piston 28 to the left viewing the drawing. The shoulder 88 on the piston 28 engages the shoulder 90 on the sleeve 76, thereby also moving the sleeve 76 to the left to separate shoulder 78 on the sleeve from the shoulder 80 on the housing. The plunger 60 will engage the camming surface 68 which forces the plunger 60 upwardly to activate the warning device. As long as the malfunction exists, the larger diameter portion 72 of the piston 28 will be disposed beneath the plunger 60 maintaining actuation of the warning device 64. As the piston 28 is shifted to the left the seal 36 deforms to permit the larger diameter portion 42 of the piston 28 to pass completely through the opening 38 in the seal 36. After this occurs, unrestricted flow of fluid from the inlet to the outlet is permitted regardless of the pressure level at the outlet.

After the malfunction is repaired, the first normal brake application introduces equal pressures into the chambers 32 and 34. However, a net force acts on the piston 28 urging the latter to the right viewing the Figure since the fluid in chamber 32 acts across an effective area $A_4$ while the fluid in chamber 34 acts across the smaller effective area $A_5$. As the piston 28 and sleeve 76 are forced to the right, the portion 42 of piston 28 is forced through the opening 38 in the seal to the position illustrated in the Figure, to restore proportioned flow of fluid to the rear wheel brakes 26. At the same time, the smaller diameter portion 70 of the piston 28 is shifted to a position beneath the plunger 60, permitting the latter to drop into the bore 12 until it engages the portion 70, thereby opening the contacts within the switch to terminate operation of the warning device 64.

What is claimed is:

1. In a vehicular braking system having first and second hydraulic circuits;
a housing having a bore therein;
piston means movable in said bore, said piston means dividing said bore into first and second chambers, said first and second chambers being in fluid communication with said first and second hydraulic circuits, respectively;
an annular seal circumscribing said bore in one of said chambers, one end of said piston means cooperating with said seal during increasing fluid pressure in said chambers to meter the flow of fluid past the seal and establish a lower level of fluid pressure on one side of the seal than exists on the other side of the seal, said piston means being responsive to a predetermined pressure differential between said first and second chambers to shift said one end away from said seal to permit unrestricted flow of fluid through said one chamber; and
reset means operatively connected to said piston means for urging the one end of the piston means into operative engagement with the seal upon equalization of fluid pressure in said first and second chambers.

2. The invention of claim 1; and
a warning switch carried by the housing;
said piston means actuating said warning switch when the piston means is shifted due to said pressure differential between said first and second chambers.

3. The invention of claim 2:
said warning switch including a plunger projecting into said bore;
said piston means having camming surfaces formed thereon for engagement with said plunger for shifting the latter to actuate said warning switch.

4. The invention of claim 1:
said bore being stepped to present larger and smaller diameter portions with a shoulder therebetween;
said reset means being a sleeve having larger and smaller outer diameter portions presenting a shoulder therebetween;
said sleeve cooperating with said piston means to define a larger area against which fluid pressure in one of the chambers acts and a smaller area against which fluid pressure in the other chamber acts whereby the shoulder on the sleeve is urged into engagement with the shoulder on the housing when equal pressures are introduced into each of said chambers.

5. The invention of claim 1:
said one end of said piston means extending through the opening defined by said annular seal and having a smaller diameter portion defining a flow path between the outer circumferential surface of said smaller portion and the inner circumferential surface of said seal and a larger diameter portion cooperating with the transversely extending surface of the seal to meter flow of fluid through said flow path.

6. The invention of claim 5:
said annular seal yielding to permit said larger diameter portion of the piston means to pass through the opening defined by the annular seal when the piston means is shifted due to said pressure differential between the first and second chambers, whereby unrestricted flow of fluid is permitted through said opening after the piston is shifted.

7. The invention of claim 5; and
resilient means operatively connected to said piston means yieldably urging said larger diameter portion out of engagement with the transverse surface of said seal.

8. A proportioning valve for regulating fluid flow from a pressure source to separate first and second circuits going to the front and rear brakes of a vehicular braking system in response to an operational pressure differential, said proportioning valve comprising:
a housing having a bore therein with first and second inlet ports connected to said pressure source, a first outlet port connected to the front brakes and a second outlet port connected to the rear brakes;
piston means for dividing said bore into first and second chambers, said first inlet and outlet ports being connected to said first chamber, said second inlet port being connected to said second chamber, said piston means having a single shaft with a first head located in the first chamber and a second head located in the second chamber, said first head being smaller in diameter than said second head;
annular seal means located in said second chamber for separating said second inlet port from said second outlet port, said fluid under pressure communicated to the first and second chamber acting on said first and second heads of the piston means, said second head being moved toward said seal means to meter the flow of fluid from said pressure source upon the development of a differential pressure force between said first and second heads, said second head shifting away from said seal means upon the development of a predetermined pressure force to permit unrestricted flow through said second chamber for activation of said rear brakes; and
reset means operatively connected to said piston means for urging said second head into operative engagement with said seal means upon equalization of pressure in said first and second chambers from said pressure source.

9. The invention of claim 8; and
a warning switch carried by the housing;
said piston means actuating said warning switch when the single shaft of said piston means is shifted a predetermined distance due to said pressure differential between said first and second chambers.

10. The invention of claim 9:
said warning switch including a plunger projecting into said bore;
said single shaft having camming surfaces formed thereon adjacent a small diameter portion for engagement with said plunger for shifting the latter to actuate said warning switch.

11. The invention of claim 8:
said bore being stepped to present larger and smaller diameter portions with a shoulder therebetween;

said reset means being a sleeve having larger and smaller outer diameter portions presenting a shoulder therebetween;

said sleeve cooperating with said piston means to define a larger area against which fluid pressure in one of the chambers acts and a smaller area against which fluid pressure in the other chamber acts whereby the shoulder on the sleeve is urged into engagement with the shoulder on the housing when equal pressures are introduced into each of said chambers.

* * * * *